Sept. 6, 1927.
T. C. ROBERTS
1,641,602
METHOD AND MEANS FOR SUPPORTING VIBRATORY STRUCTURES
Filed Aug. 18, 1921
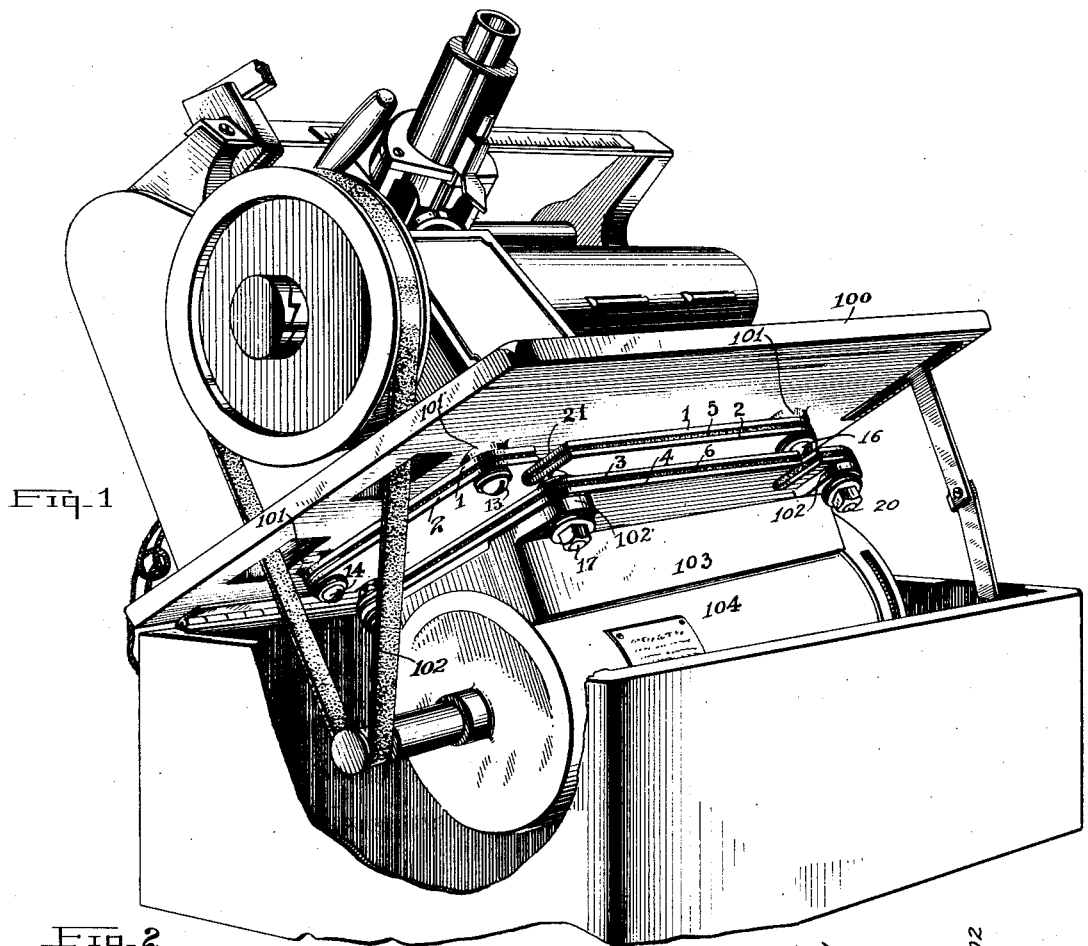
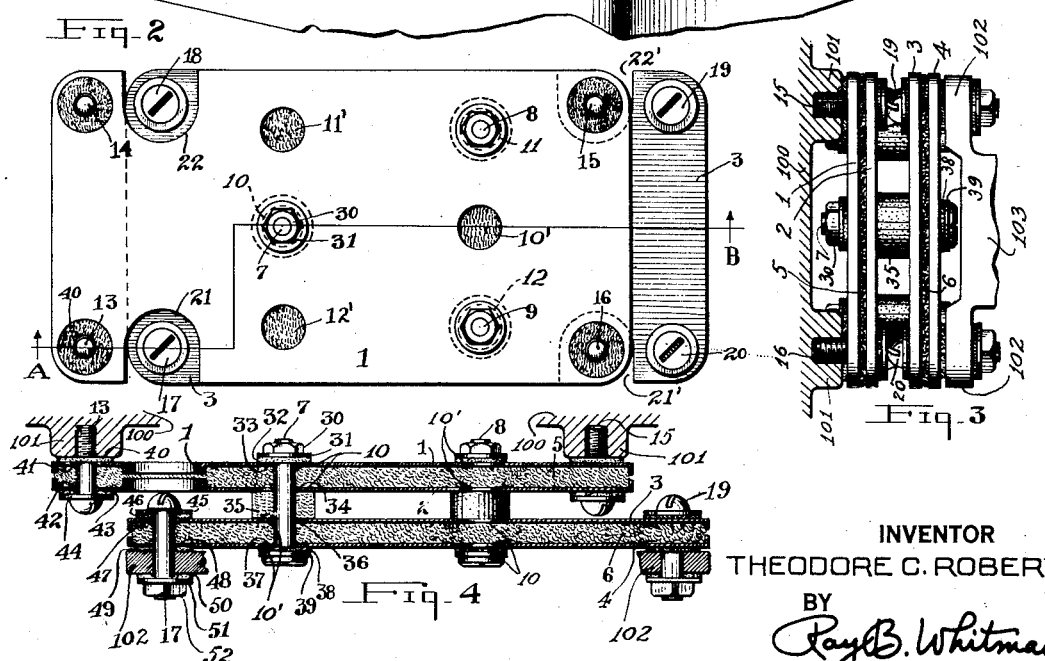
INVENTOR
THEODORE C. ROBERTS
BY
Ray B. Whitman
ATTORNEY Patented Sept. 6, 1927.

1,641,602

UNITED STATES PATENT OFFICE.

THEODORE C. ROBERTS, OF NEW YORK, N. Y., ASSIGNOR, BY MESNE ASSIGNMENTS, TO DICTAPHONE CORPORATION, OF NEW YORK, N. Y., A CORPORATION OF NEW YORK.

METHOD AND MEANS FOR SUPPORTING VIBRATORY STRUCTURES.

Application filed August 18, 1921. Serial No. 493,475.

This invention relates to improvements in methods of and means for supporting vibratory structures, and particularly the present embodiment contemplates the provision of suspension means for the motors of dictaphones, phonographs, or like structures, where it is of the utmost importance to eliminate vibration to as high a degree as possible.

In particular, it is an object of the invention to provide a structure into which vibrations generated by the motor will be conducted, and in which a series of non-responsive, unattuned structures will dampen or absorb these vibrations before they can be transmitted through the structure. To this end, the present embodiment of the invention provides a suspension structure including a plurality of spaced vibration-reducing and sound-deadening plates in which there exists an unsymmetrical relation between the several points of connection; and, further, in which there is a variance in number and position between the connection means at each side of the individual plates, thus tending to produce a neutralization of the vibrations set up in the suspension structure, and which will be instrumental in preventing their transmission.

A further object of the invention is to provide a mechanically efficient structure having the necessary strength and rigidity to properly support the motor, and in which the several main parts will be interchangeable and reversible so that a single standard type of part may be employed in constructing the device, thereby greatly simplifying and economizing the process of manufacture.

With these and other objects in view, an embodiment of the invention is shown in the accompanying drawings, and this will be hereinafter more fully described with reference thereto, and the invention finally pointed out in claims.

In the accompanying drawings—

Fig. 1 is a perspective view of a dictaphone embodying these suspension improvements, and showing the base-plate raised to clearly display the motor and the suspension means therefor;

Fig. 2 is a plan view of the suspension means alone, as here disclosed;

Fig. 3 is an end view of same, and showing a fragment of the motor attached; and Fig. 4 is a longitudinal, vertical-sectional view, taken along the line A—B of Fig. 2.

Similar reference characters indicate corresponding parts throughout the several figures of the drawing.

Referring to the drawings, there is disclosed generally a pair of spaced, laterally-disposed, sound-deadening and vibration-reducing plate members, each member consisting of an upper and a lower flanged rectangular plate, 1 and 2, and 3 and 4, respectively; and having layers of felt or other suitable resilient material, 5 and 6, therebetween. These plates are connected by bolts 7, 8, and 9, positioned in apertures 10, 11, and 12, respectively, in the plates. The upper plate is connected at its corners, as shown, to the base-plate 100 of the dictaphone by threaded bolts 13, 14, 15, and 16, positioned in enlargements or bosses 101 formed upon the base; the lower plate is connected at the corners to ears 102, provided on the base 103 of the motor 104, by means of threaded bolts 17, 18, 19, and 20.

The plates are formed, preferably, of thin sheet metal having a flange rolled or bent at the periphery, so that the plates will be stiff at the edges and more or less elastic in the center. The triangular connection between the plates forms a trussed stiffening area within the plates, rendering the same substantially rigid for the purpose of support of the motor. By enlarging the size of the triangle, the stiffening effect would, of course, be increased.

The upper and lower plates, it will be noted, are offset longitudinally with relation to each other, the one being in inverted or reversed relation to the other; and for the purpose of permitting one shape of plate to be utilized for both upper and lower plates, and assembled in this reversed and offset relation, the apertures 10, 11, and 12 are formed in each plate in duplicate, but in reversed relation to each other, and relatively nearer one end than the other, these duplicate apertures being designated by 10', 11', and 12'.

Each plate is provided with two cut-out portions 21 and 22, these portions being referred to in the lower pair of plates as 21', 22', since they are the same cut-out portions, but in reversed position. Bolts 15, 16, 17, and 18 are positioned in line with these cut-out portions, and this allows the plate-members to be brought close together without contact of the screws, and also gives free access to the heads of the screws with a screw driver when assembling.

Each of the bolts 7, 8, and 9 is secured by a nut 30, Fig. 4, as designated on bolt 7, between which and the face of the plates there are interposed both a metal washer 31 and a felt washer 32; and within the apertures of the plates 1 and 2, there are provided filling washers 33 and 34 of felt or the like.

Between the upper and lower main plates and surrounding the bolts, there are provided cushioning sleeves 35 of felt, rubber, or other suitable material, and which serves to space the two plate-members from each other, and through which the vibrations passing laterally through the lower plate-member are partially absorbed as they are transmitted vertically to the upper plate-member. In the apertures of the plates 3 and 4, there are provided filling washers 36 and 37, and between the heads of the bolts and the under surface of the plate 4, there are provided felt washers 38 and metal washers 39, this construction being the same as in the plates 1 and 2.

The upper main plate is spaced from the under side of the base plate of the machine by means of felt washers 40 surrounding the bolts 13, 14, 15, and 16, and filling washers 41 and 42 engaging the enlarged openings of the plates, and between the heads of the bolts and the plate 2, there are interposed felt washers 43 and metal washers 44.

The associated structures surrounding the bolts 17, 18, 19, and 20, Fig. 4, are substantially similar and comprise metal washers 45 and felt washers 46 interposed between the heads of the bolts and the plate 3; filling washers 47 and 48 within the apertures of the plates through which the bolts are engaged, and felt washers 49 interposed between the plate 4 and the supporting lugs of the motor to space the same from the suspension plates.

The motor is secured by means of nuts 52 engaging the threaded ends of the bolts 17, 18, 19, and 20, and between each of the said nuts and the under side of the lugs, there are interposed felt washers 50 and metal washers 51. The bosses 101 and 102, provided respectively upon the base-plate 100 and upon the motor frame, space the base-plate and motor frame from the suspension means, so as to accommodate the head and nut ends of the connecting bolts 7, 8, and 9.

It will be noted that all adjacent metal parts are separated from each other by sound-deadening, cushioning structures and that any free vibration of the metals parts is prevented by the substantial support at all points by such structures.

An important feature of the improvements is the provision of connecting means between the plates, which means are at variance, both in number and geometrical arrangements, to the connecting means between the respective plates, and between the motor and base-plate. While it has so far been found most satisfactory to provide the connection with the motor and the base-plate in the four corners of the plates, and the connection between the plates at three points, it may be here stated that this number and placement is arbitrary from the standpoint of the broad aspect of the invention, and any other arrangement suitable for the purpose may be employed.

The result of such an arrangement, embodying this invention, is to cause the vibrations from the four-point support of the motor, which support has its own natural period of vibration, in reaching the three-point suspension to pass through the material of the plates, convergingly toward the center, where the opposing vibratory forces will be more or less neutralized; and at the center, what little remains of these vibratory forces after such neutralization will be transmitted to the three-point suspension, which opposed to the four-point system will not respond well to the four-point system of vibration. At this stage a further dampening or absorption of the vibrations occurs through their transmission into the felt-sound-deadening washers. After passing through the three-point suspension system, the remaining vibrations in reaching the base plates 100, if at all pass divergingly through the upper plates, being further absorbed in passing to the sound-deadening structure of the corners; and finally, whatever vibrations remain tend to pass to the base-plate 100 by a four-point system again, where they are further absorbed in passing through the felt washers interposed between the upper sound-deadening plates and the base-plate.

A further important feature is the uneven and differential spacing of the suspension supporting bolts 7, 8, and 9, from the corner suspension connections, so that the distances which the vibrations travel from bolt to bolt through the plates are at variance; and, consequently a structure is provided, the component parts of which are non-resonant with each other. This uneven and differential placement of the suspension points, together with the uneven number relation between the suspension points, above and below the plates, produces a series of vibratory zones which are not naturally responsive to vibrations present in one another into which the vibrations from the motor are transmitted. So, through the combined effect of the naturally sound-deadening structure and material embodied in the construction, and the neutralizing and counteracting effect of the uneven and differential relation of the several parts, a substantially complete absorption of the vibrations is effected within the suspension means itself, and hence vibration in the base-plate of the machine, which might otherwise be transmitted from the motor or other mechanism associated therewith, is practically, if indeed not entirely, eliminated.

Mechanically, the structure lends itself to approved and economical manufacturing methods; deterioration in use is negligible; and complete adjustment is possible by tightening the bolts 7, 8 and 9, and 13 to 20, to compensate for any derangement or looseness of the parts.

While there is illustrated and described a preferred and satisfactory manner of carrying out this invention, it is obvious that changes may be made therein within the spirit and scope of the invention, as defined in the appended claims.

What is claimed, and for which Letters Patent is desired, is:

1. A vibration-absorbing device adapted to be interposed between a support and a vibratory structure, comprising a plurality of superimposed spaced plates connected near their edges to the support and the vibratory structure at a plurality of spaced points of contact and a plurality of spaced means connecting the superimposed spaced plates, and inwardly removed from the points of contact of the plates with the support and the vibratory structure, respectively.

2. A vibration-absorbing device adapted to be interposed between a support and a vibratory structure, comprising a plurality of superimposed spaced plates connected relatively near their edges respectively to the support and the vibratory structure, one of the plates being offset longitudinally relative to the other, and means connecting the plates together and inwardly removed from the points of connection of the plates to the support and the vibratory structure, the plates being of corresponding form and reversible and interchangeable relative to each other.

3. A vibration-absorbing device adapted to be interposed between a support and a vibratory structure, comprising a plurality of vibration-absorbing plate units, each comprising an upper and lower plate, a resilient spacing layer therebetween, connection means adapted to connect the plate units respectively to the support and the vibratory structure, and to each other, and resilient cushioning and spacing means interposed between the plate units in staggered relation to the points of connection of the plate units with the support and the vibratory structure.

4. In a vibration-absorbing connection, the combination of vibration-dissipating means having a plurality of connecting means securing it to a vibratory body and located at spaced points of contact on said vibrating body, and a plurality of other connecting means located at spaced points of contact to which said vibrations tend to be transmitted, said second-named connecting means being at variance in position and number to the first-named connecting means and bounding a portion of said vibration-dissipating means having different vibratory characteristics from the portion bounded by said first-named connecting means, and another vibration-dissipating means connected with the first-named vibration-dissipating means solely by said second-named connecting means at the second-named points of contact and having a plurality of connecting means securing it to a supporting body and located at spaced points of contact on said supporting body to which the vibrations tend to be transmitted, said last-named connecting means being at variance in position and number to the second-named connecting means and bounding a portion of said second-named vibration-dissipating means having different vibratory characteristics from the portion bounded by the second-named connecting means on said second-named vibration-dissipating means.

5. In a vibration-absorbing connection the combination of vibration-dissipating means having a plurality of connecting means securing it to a vibratory body and located at spaced points of contact on said vibrating body, and a plurality of other connecting means located at spaced points of contact to which said vibrations tend to be transmitted, said second-named connecting means being at variance in position and number to the first-named connecting means and bounding a portion of said vibration-dissipating means having different vibratory characteristics from the portion bounded by said first-named connecting means, and another vibration-dissipating means connected with the first-named means solely by said second-named connecting means at the second-named points of contact and having a plurality of connecting means securing it to a supporting body and located at spaced points of contact on said supporting body to which the vibrations tend to be transmitted, said last-named connecting means being at variance in position and number to the second-named connecting means and bounding a portion of said second-named vibration-dissipating means having different vibratory characteristics from the portion bounded by the second-named connecting means on said second-named sound-dissipating means, each of said sound-dissipating means comprising a relatively thin metallic plate backed by a soft resilient material to damp the vibration transmitted through the metallic plate.

6. A suspension device for vibratory bodies, including a plurality of sets of spaced plates the plates of each set being connected together by means for securing the sets of plates to a vibratory body and a supporting body respectively, and sound-deadening material between the plates of each set, the sets of plates being secured to each other at points intermediate the connections of the plates of each set to each other and the vibratory body and supporting body respectively.

7. A vibration-deadening plate adapted to be inserted between a supporting and a supported structure having four points of connection to the supporting member, and another vibration-deadening plate having four points of connection to the supported member and three points of connection to the first-named plate.

Signed at Bridgeport, in the county of Fairfield and State of Connecticut, this 15th day of August, A. D. 1921.

THEODORE C. ROBERTS.

CERTIFICATE OF CORRECTION.

Patent No. 1,641,602.                                                    Granted September 6, 1927, to

THEODORE C. ROBERTS.

It is hereby certified that error appears in the printed specification of the above numbered patent requiring correction as follows: Page 1, lines 6, 47 and 73, the word "dictaphone" should be capitalized; page 2, line 65, for the word "metals" read "metal"; and that the said Letters Patent should be read with these corrections therein that the same may conform to the record of the case in the Patent Office.

Signed and sealed this 8th day of November, A. D. 1927.

M. J. Moore,
Acting Commissioner of Patents.

Seal.